US006133346A

United States Patent [19]

Ueda et al.

[11] Patent Number: 6,133,346

[45] Date of Patent: Oct. 17, 2000

[54] CHLORINATED POLYOLEFIN COMPOSITION WITH GOOD STABILITY

[75] Inventors: Takaaki Ueda; Keiji Urata, both of Iwakuni, Japan

[73] Assignee: Nippon Paper Industries Co., Ltd., Tokyo, Japan

[21] Appl. No.: 09/189,848

[22] Filed: Nov. 12, 1998

[30] Foreign Application Priority Data

Dec. 22, 1997 [JP] Japan .................................... 9-365744

[51] Int. Cl.[7] ............................. C08K 3/10; C08L 63/02

[52] U.S. Cl. ............................................ 523/457; 524/450

[58] Field of Search ............................. 523/457; 524/450

[56] References Cited

FOREIGN PATENT DOCUMENTS 2 264 117 8/1993 United Kingdom .

OTHER PUBLICATIONS

Patent Abstracts of Japan, JP 63–50381, Oct. 7, 1988.
Patent Abstracts of Japan, JP 57–36128, Aug. 2, 1982.
Patent Abstracts of Japan, JP 50–37688, Dec. 4, 1975.
Patent Abstracts of Japan, JP 46–27489, Aug. 31, 1993.
Patent Abstracts of Japan, JP 63–36624, Jul. 21, 1988.
Patent Abstracts of Japan, JP 60–49654, Nov. 2, 1985.
Patent Abstracts of Japan, JP 57–31756, Jul. 6, 1982.
Patent Abstracts of Japan, JP 06–306227 Jun. 1994.
Patent Abstracts of Japan, AN 08191749, JP 10–036601, Jun. 1998.
Patent Abstracts of Japan, AN 09021070, JP 10–204372, Apr. 1992.
Patent Abstracts of Japan, JP 09–235433, May 1991.
Patent Abstracts of Japan, JP 50–35445, Nov. 17, 1975.
Patent Abstracts of Japan, JP 59–166534, Sep. 19, 1984.
Patent Abstracts of Japan, JP 01–110580, Apr. 27, 1989.
Database WPI, Derwent Publications, AN 82–8925OE, JP 57–147552, Sep. 11, 1982.
Database WPI, Derwent Publications, AN 94–238921, JP 06–172599, Jun. 21, 1994.

*Primary Examiner*—Robert Dawson
*Assistant Examiner*—D. Aylward
*Attorney, Agent, or Firm*—Oblon, Spivak, McClelland, Maier & Neustadt, P.C.

[57] ABSTRACT

Disclosed is a chlorinated polyolefin composition with good stability with 0.1 to 10 parts by weight of hydrotalcites compound and 1 to 10 parts by weight of epoxy compound with epoxide equivalent of 100 to 500 added to 100 parts by weight of chlorinated polyolefin with chlorine content of 5 to 50% by weight, hydrotalcite compound/epoxy compound being within a range of 0.01 to 10 (weight ratio). The subject is to provide a chlorinated polyolefin composition and producing method thereof for paints, primers, printing inks or adhesives with more improved adherence and other physical properties to polyolefin by improving the stability of chlorinated polyolefin.

5 Claims, No Drawings

CHLORINATED POLYOLEFIN COMPOSITION WITH GOOD STABILITY

BACKGROUND OF THE INVENTION

The present invention relates to a binder resin composition to be used for the purpose of protection or ornamentation of polyolefinic resins such as polypropylene, polyethylene, ethylene-propylene copolymer and ethylene-propylene-diene copolymer. In more detail, it relates to a chlorinated polyolefin composition to be used as a binder resin for paints, primers, printing inks or adhesives, having excellent adherence to these sheets, films and moldings and excellent other physical properties together with good stability.

Because of high productivity, broad freedom of design and many advantages such as light weight, antirust and shock resistance, in recent years, plastics have been used most frequently as the materials for automotive parts, electrical parts, building materials, food packaging films, etc. In particular, because of low price and many excellent properties such as moldability, chemical resistance, heat resistance, water resistance and good electrical characteristics, the polyolefinic resin is used extensively as the industrial materials, and is one of materials that the growth of demand thereof is most expected in future. Different from synthetic resins having polarity such as polyurethane resin, polyamide resin, acrylic resin and polyester resin, however, the polyolefinic resin has a drawback of difficult painting and adhesion because of nonpolarity and crystallinity.

For the painting and adhesion of such polyolefinic resin which is difficult in adherence, low-chlorinated polyolefin having strong adherent force to polyolefinic resin has been used so far as a binder resin. For example, in Japanese Patent Publication No. Sho 46-27489, a chlorinated isotactic polypropylene chlorinated up to 20 to 40% by weight is proposed as a binder resin for printing ink of polypropylene film. In Japanese Patent Publication Nos. Sho 50-35445 and Sho 50-37688, a chlorinated propylene-ethylene copolymer chlorinated up to 20 to 40% by weight is proposed as a binder resin for printing ink or adhesive to polyolefin. Also, in Japanese unexamined Patent Publication Nos. Sho 57-36128 and Sho 59-166534, Japanese Patent Publication Nos. Sho 63-50381 and Sho 63-36624, and the like, a low-chlorinated polypropylene or low-chlorinated propylene-olefin copolymer with chlorine content of 5 to 50% that contains carboxylic acid and/or carboxylic anhydride is proposed as a primer for painting or a binder resin for coating of polyolefinic moldings.

Further, in Japanese Unexamined Patent Publication No. Hei 1-110580, a chlorinated terpolymer that contains carboxylic acid and/or carboxylic anhydride, comprising unsaturated carboxylic acid monomer, unsaturated vinyl ester monomer and ethylene, up to 3 to 50% by weight is proposed as a binder resin for adhesive of polyolefinic resin.

In general, since the low-chlorinated polyolefins as described above are chlorinated by blowing chlorine gas after dispersing or dissolving various polyolefins into water or chlorinating solvent, chlorine is introduced heterogeneously into polyolefin. Consequently, these low-chlorinated polyolefins become unstable, resulting in a drawback of accompanying dehydrochlorination upon exposure to ultraviolet rays or high temperature to deteriorate.

As the stabilizers for these low-chlorinated polyolefins, stabilizers used for poly(vinyl chloride) being a chlorine-based resin can be applied as they are. For example, they include metal soaps such as calcium stearate and lead stearate, salts of inorganic acids such as lead oxide and tribasic lead sulfate, organometallic compounds such as dibutyl tin dilaurate and dibutyl tin maleate, and epoxy compounds such as epoxidated soybean oil and glycidyl ether of glycerine (Poly(vinyl chloride)-Its Chemistry and Industry, 3rd ed. published on Jan. 25, 1966, Asakura Book-Store Co., Ltd.).

However, almost all of stabilizers added to commercial low-chlorinated polyolefins and chlorinated paraffin are epoxy compounds. Moreover, as the use of epoxy compounds is exemplified as the stabilizers of low-chlorinated polyolefins also in Japanese Patent Publication Nos. Sho 57-31756 and Sho 60-49654, Japanese Unexamined Patent Publication Nos. Hei 6-306227 and Hei 7-73362, Japanese Patent Application Nos. Hei 8-191749 and Hei 9-21070, and the like, it is the status quo that epoxy compounds are used generally for the stabilizers of low-chlorinated polyolefins. However, the epoxy compounds cannot necessarily be said to be effective as the stabilizers of chlorinated polyolefins, thus improvement in stability of these chlorinated polyolefins has been looked for.

The invention intends to provide a chlorinated polyolefin compound for paints, primers, printing inks or adhesives, more improved in adherence and other physical properties to polyolefin by improving the stability of low-chlorinated polyolefin that was insufficient until now.

SUMMARY OF THE INVENTION

The inventors have found that a chlorinated polyolefin composition, wherein 0.1 to 10 parts by weight of hydrotalcites compound and 1 to 10 parts by weight of epoxy compound with epoxide equivalent of 100 to 500 are added to 100 parts by weight of chlorinated polyolefin with chlorine content of 5 to 50% by weight and said hydrotalcites compound/said epoxy compound falls within a range of weight ratio of 0.01 to 10, exhibits good stability and improves the adherence to polyolefin and other physical properties, leading to the completion of the invention.

DETAILED DESCRIPTION OF THE INVENTION

The chlorinated polyolefin to be used in the invention can be obtained easily through a chlorinating reaction of polyolefin by publicly known methods: For example, the reaction is conducted by dispersing or dissolving raw material polyolefin into water or a medium such as carbon tetrachloride or chloroform and by blowing chlorine gas at a temperature ranging from 50 to 120° C. under pressure or ambient pressure in the presence of catalyst or under the irradiation of ultraviolet rays.

For the raw material polyolefins, crystalline polypropylene, propylene-α-olefin copolymer, terpolymer comprising unsaturated carboxylic acid monomer, unsaturated vinyl ester monomer and ethylene, ethylene-vinyl acetate copolymer, etc. are mentioned.

The crystalline polypropylene is isotactic polypropylene and one with weight average molecular weight of 10,000 to 300,000 can be used.

The propylene-α-olefin is a copolymer of the main component of propylene with α-olefin and both block polymer and random polymer thereof can be used. As the α-olefin components, for example, ethylene, 1-butene, 1-pentene, 1-hexene, 1-heptene, 1-octene, 4-methyl-1-pentene, etc. can be exemplified. The content of propylene component is optimum in the range of 50 to 98 mol %, and, if under 50 mol %, the adherence to polypropylene decreases. Also, if over 98 mol %, the flexibility of painted film becomes poor.

The terpolymer is a copolymer of unsaturated carboxylic acid monomer, unsaturated vinyl ester monomer and ethylene obtained by a publicly known process such as high-pressure radical polymerization process, solution polymerization process or emulsion polymerization process.

As the unsaturated carboxylic acid monomer components, for example, acrylic acid, methacrylic acid, maleic acid, itaconic acid, fumaric acid, maleic anhydride, itaconic anhydride, etc. are exemplified. As the unsaturated vinyl ester monomers, for example, methyl acrylate, ethyl acrylate, butyl acrylate, methyl methacrylate, ethyl methacrylate, butyl methacrylate, etc. are exemplified. The content of unsaturated carboxylic acid monomer is optimum in the range of 1 to 10% by weight. If under 1%, the content of polar group in composition becomes too low, resulting in insufficient adhesiveness, and if over 10%, copolymer gelates on the way of chlorination.

The content of unsaturated vinyl ester monomer is optimum in the range of 1 to 50% by weight. If under 1%, the improvement effect on adhesiveness is not recognized, and, if over 50% by weight, advantages such as processibility, flexibility and mechanical strength that the ethylene polymer possesses is lost.

The ethylene-vinyl acetate copolymer is a copolymer of ethylene and vinyl acetate obtained by high-pressure radical polymerization process, which has 5 to 45 mol % of vinyl acetate component. If the amount of vinyl acetate component is under 5 mol %, the adherence to polar materials is poor, and, if over 45 mol %, the hardness of painted film endurable in practical use is not achieved.

Moreover, as a raw material polyolefin, carboxyl group-containing polyolefin, wherein crystalline polypropylene or propylene-α-olefin copolymer is graft copolymerized with 1 to 10% by weight of at least one kind of unsaturated carboxylic acid monomer selected from carboxylic acids and/or carboxylic anhydrides can also be used. The graft copolymerization can be conducted by publicly known processes such as a process (melt process), wherein said polyolefin is molten by heating over melting point in the presence of radical generator to react and a process (solution process), wherein, after said polyolefin was dissolved into organic solvent, it is reacted by heating and stirring in the presence of radical generator.

In the case of melt process, the reaction is conducted at a temperature between over melting point and under 300° C., using Banbury mixer, kneader, extruder, etc., hence it has advantages of capability of reacting in short time as well as simple manipulation.

In the solution process, it is preferable to use aromatic solvents such as toluene and xylene as reaction solvents. The reaction temperature is 100 to 180° C., and it has advantages of less side-reaction and capability of giving uniform graft polymer.

The radical generators to be used for the graft copolymerization reaction include, for example, organic peroxides like benzoyl peroxide, di-tert-butyl peroxide, tert-butyl hydroperoxide, dicumyl peroxide, tert-butyl peroxybenzoate, methyl ethyl ketone peroxide and cumene hydroperoxide, and azonitriles such as 2,2-azobis(2-methylbutyronitrile), 2,2-azobisisobutyronitrile, 2,2-azobis (2,4-dimethylvaleronitrile) and 2,2-azobis(4-methoxy-2,4-dimethylvaleronitrile).

Moreover, the content of unsaturated carboxylic acid monomer is optimum in the range of 1 to 10% by weight. If under 1%, the content of polar group in composition becomes too low, resulting in insufficient adhesiveness, and, if over 10%, the graft reaction becomes insufficient and, since unreacted unsaturated carboxylic acid monomers remain in the system, good physical properties cannot be obtained. For at least one kind of unsaturated carboxylic acid monomer selected from carboxylic acids and/or carboxylic anhydrides to be used for the graft polymerization reaction, said unsaturated carboxylic acid monomers can be used as they are.

Furthermore, the chlorinated polyolefin to be used in the invention can also be obtained by chlorinating crystalline polypropylene or propylene-α-olefin copolymer and then graft copolymerizing 1 to 10% by weight of at least one kind of unsaturated carboxylic acid monomer selected from carboxylic acids and/or carboxylic anhydrides therewith.

Namely, after having chlorinated the polyolefin by said method, carbon tetrachloride or chloroform of a chlorinating solvent is distilled off and replaced with toluene or xylene, and the solution of chlorinated polyolefin thus obtained may be subjected to the reaction according to said solution process, wherein the reaction temperature is preferable to be 80 to 110° C. If the temperature is too low, the progress of reaction becomes slow, and, if it is too high, then the chlorinated polyolefin decomposes, which are unpreferable.

The chlorine content of chlorinated polyolefin to be used in the invention varies depending on the type of raw material polyolefin before chlorination, and a range from 5 to 50% by weight can be applied. If the chlorine content is under 5% by weight, the solubility into solvent is poor, resulting to injure the fluidity at low temperature remarkably. If over 50% by weight, the adherence to polyolefinic resins becomes poor, which is unpreferable. In following, various chlorinated polyolefins to be used in the invention and the applying chlorine content will be shown. For the similar reason as described above, if the chlorine content is too low, the solubility into solvent is poor and the fluidity at low temperature is injured. If the chlorine content is too high, then the adherence to polyolefinic resins becomes poor, which is unpreferable.

In the case of chlorinated polypropylene, wherein the raw material is crystalline polypropylene, the applied chlorine content is 15 to 40% by weight.

Also in the carboxyl group-containing chlorinated polypropylene, wherein the raw material is crystalline polypropylene and contains carboxylic acid and/or carboxylic anhydride, the applied chlorine content is 15 to 40% by weight.

In the case of chlorinated propylene-α-olefin copolymer, wherein the raw material is propylene-α-olefin copolymer containing 50 to 98 mol % of propylene component, the applied chlorine content is 10 to 35% by weight.

Also in the carboxyl group-containing chlorinated propylene-α-olefin copolymer, wherein the raw material is propylene-α-olefin copolymer containing 50 to 98 mol % of propylene component and contains carboxylic acid and/or carboxylic anhydride, the applied chlorine content is 10 to 35% by weight.

In the case of chlorinated terpolymer, wherein the raw material is terpolymer comprising unsaturated carboxylic acid monomer, unsaturated vinyl ester monomer and ethylene, the applied chlorine content is 10 to 30% by weight.

In the case of the raw material being ethylene-vinyl acetate, the applied chlorine content is 5 to 50% by weight.

The compounds of hydrotalcites to be used in the invention are nonstoichiometric compounds represented by a following general formula.

General formula: $[M^{2+}{}_{1-X}M^{3+}{}_X(OH)_2]^{X+}[A^{n-}{}_{X/N}.mH_2O]^{X-}$ here, $M^{2+}$: bivalent metals such as $Mg^{2+}$, $Fe^{2+}$, $Co^{2+}$, $Ni^{2+}$, $Cu^{2+}$ and $Zn^{2+}$ $M^{3+}$: trivalent metals such as $Al^{3+}$, $Fe^{3+}$, $Cr^{3+}$, $Co^{3+}$ and $In^{3+}$ $A^{n-}$: n-valent anions such as $OH^-$, $F^-$, $Cl^-$, $Br^-$, $NO_3^-$, $CO_3^{2-}$, $SO_4^{2-}$, $Fe(CN)_6^{3-}$, $CH_3COO^-$, oxalate ion and salicylate ion X is within a range of $0<x\leqq 0.33$.

Compound preferable particularly among these compounds of hydrotalcites is one represented by a formula $Mg_{4.5}Al_2(OH)_{13}—CO_3.3.5H_2O$ and $Mg_6Al_2(OH)_{16}CO_3.4H_2O$.

The epoxy compounds to be used in the invention include epoxidated soybean oil and epoxidated linseed oil wherein natural unsaturated group-containing vegetable oils is epoxidated with peracid such as peracetic acid; epoxidated fatty acid esters wherein unsaturated fatty acid esters of oleic acid, tall oil fatty acid, soybean oil fatty acid, etc. are epoxidated; epoxidated alicyclic compounds represented by epoxidated tetrahydrophthalate; compounds obtained by condensing bisphenol A and/or polyhydric alcohols with epichlorohydrin, for example, bisphenol A glycidyl ether, ethylene glycol glycidyl ether, propylene glycol glycidyl ether, polyglycerol polyglycidyl ether, sorbitol polyglycidyl ether, etc.; monoepoxy compounds represented by butyl glycidyl ether, 2-ethylhexyl glycidyl ether, decyl glycidyl ether, stearyl glycidyl ether, allyl glycidyl ether, phenyl glycidyl ether, sec-butylphenyl glycidyl ether, tert-butylphenyl glycidyl ether, phenolpolyethylene oxide glycidyl ether, etc., and the like, and any compound having glycidyl group in molecule with the epoxide equivalent being 100 to 500 can be used.

If the epoxide equivalent is under 100, the epoxy compound is scattered to be lost out of system on concentrating or drying chlorinated polyolefin, resulting to decrease of the concentration as a stabilizer, which is unpreferable. Also, if the epoxide equivalent exceeds 500, the compatibility with chlorinated polyolefin is injured to affect adversely on the physical properties of painted film, which is unpreferable.

It is preferable to put the inventive composition into practice by adding hydrotalcites compound within a range of 0.1 to 10 parts by weight and epoxy compound with epoxide equivalent of 100 to 500 within a range of 1 to 10 parts by weight to 100 parts by weight of chlorinated polyolefin with chlorine content of 5 to 50% by weight respectively. Namely, if the amount of hydrotalcite compound is under 0.1 part by weight, sufficient stability cannot be obtained and, if over 10 parts by weight, said composition does not become transparent painted film on making dried painted film, which are unpreferable. On the other hand, if the amount of epoxy compound is under 1 part by weight, sufficient stability cannot be obtained and, if over 10 parts by weight, said composition affords tack in the painted film on making dried painted film to cause blocking, which are unpreferable. Moreover, the weight ratio of hydrotalcite compound to epoxy compound is preferable to be within a range of "hydrotalcite compound/epoxy compound=0.01–10", and, if under 0.01 or over 10, the effect due to the combined use of these compounds can not be obtained.

The method of producing the inventive chlorinated polyolefin solution composition can be achieved in a way that, after completion of chlorinating reaction, solvent for chlorinating reaction such as carbon tetrachloride or chloroform is distilled off under reduced pressure and replaced with toluene, xylene or the like, followed by addition of hydrotalcites compound and epoxy compound, but it may also be achieved in a way that, after solvent for chlorinating reaction was distilled off to some extent and then hydrotalcites compound and epoxy compound are added, followed by replacement with toluene or xylene. Moreover, in other way that, after the chlorinated polyolefin was solidified by a method shown below, it may be dissolved into toluene or xylene.

The method of solidifying the inventive chlorinated polyolefin composition can be achieved in a way that, after completion of chlorinating reaction, solvent for chlorinating reaction such as carbon tetrachloride or chloroform is distilled off under reduced pressure and hydrotalcites compound and epoxy compound are added to this concentrated reaction liquor, followed by drying with drum dryer. Also, the method can be achieved in a way that the reaction solvent is removed completely with an extruder with vent attached, having a vent port installed for distilling off the reaction solvent under reduced pressure, in place of drum dryer and solids of chlorinated polyolefin composition is extruded strand-like, followed by pelletization with underwater cutter or water-cooled pelletizer. Moreover, a method of further attaching fine powders of the hydrotalcites compound onto the surface of pellets solidified by adding hydrotalcite compound and epoxy compound is also effective from viewpoints of stability of pellet and prevention of blocking. Furthermore, the method of adding hydrotalcite compound and epoxy compound to chlorinated polyolefin may be any of those that a mixture of mixed hydrotalcite compound and epoxy compound beforehand is added to chlorinated polyolefin, that epoxy compound is added after hydrotalcite was added, and that addition is made conversely, in any of which no significant difference can be observed in the effect on stability.

The chlorinated polyolefin composition of the invention may be used for coating as it is, but can be used as a paint or ink by adding pigment, solvent or other additives, followed by kneading and dispersing thereof. In addition, it can also be used as a primer for the adhesion or painting to polypropylenic resin and other various plastics.

Moreover, said composition exhibits balanced physical properties of painted film by itself, but, if need be, it may be used with further adding alkyd resin, acrylic resin, polyacrylpolyol, polyester resin, polyesterpolyol, polyether resin, polyetherpolyol, polyurethane resin, chlorinated polyolefin, etc.

The feature of the invention lies in achieving a remarkable improvement in the stability of chlorinated polyolefin, which has been insufficient so far, by using a complex system of hydrotalcites compound and epoxy compound as the stabilizers of chlorinated polyolefin. The mechanism why the stabilizers of this complex system improves the stability of chlorinated polyolefin is unclear. However, the invention has made possible the use of chlorinated polyolefin under severe conditions.

In following, the invention will be illustrated in more detail based on the examples, but the invention is not confined thereto.

PRODUCTION EXAMPLE 1

Into a glass-lined reaction kettle were charged 6 kg of crystalline polypropylene with melt index of 14 g/min (measured according to ASTM D1238-62T) and were dissolved into succesively added 100L of carbon tetrachloride enough under the conditions of 2 kg/cm$^2$-110° C., thereafter chlorine gas was blown into from the bottom of reaction kettle on irradiating ultraviolet rays, to obtain a reaction liquor with chlorine content of 30% by weight. Then, after concentrating it with evaporator, various epoxy compounds and hydrotalcite compound shown in Table 1 were added, respectively, as the stabilizers, and, then carbon tetrachloride of the reaction solvent was replaced with toluene to obtain 15 types of chlorinated polypropylenes with solids concentration of 20% by weight (in toluene solution).

TABLE 1

Substance of various stabilizers

| No. | Stabilizer | Epoxide equivalent | Addition* level |
|---|---|---|---|
| 1 | Bisphenol A glycidyl ether | 190 | 4% |
| 2 | Epoxidated soybean oil | 250 | 4% |
| 3 | Polyglycerol polyglycidyl ether | 173 | 4% |
| 4 | 2-Ethylhexyl glycidyl ether | 186 | 4% |
| 5 | Phenyl glycidyl ether | 154 | 4% |
| 6 | sec-Butylphenyl glycidyl ether | 226 | 4% |
| 7 | Hydrotalcite Compound | — | 4% |
| 8 | Bisphenol A glycidyl ether | 190 | 2% |
| | Hydrotalcite compound | — | 1% |
| 9 | Epoxidated soybean oil | 250 | 2% |
| | Hydrotalcite compound | — | 1% |
| 10 | Polyglycerol polyglycidyl ether | 173 | 2% |
| | Hydrotalcite compound | — | 1% |
| 11 | 2-Ethylhexyl glycidyl ether | 186 | 2% |
| | Hydrotalcite compound | — | 1% |
| 12 | Phenyl glycidyl ether | 154 | 2% |
| | Hydrotalcite compound | — | 1% |
| 13 | sec-Butylphenyl glycidyl ether | 226 | 2% |
| | Hydrotalcite compound | — | 1% |
| 14 | sec-Butylphenyl glycidyl ether | 226 | 10% |
| | Hydrotalcite compound | — | 0.1% |
| 15 | sec-Butylphenyl glycidyl ether | 226 | 1% |
| | Hydrotalcite compound | — | 10% |

*Addition level: % by weight based on solids of chlorinated polyolefin
Hydrotalcite compound: $Mg_{4.5}Al_2(OH)_{13}CO_3.3.5H_2O$ was used.

PRODUCTION EXAMPLE 2

After chlorination and addition of stabilizers in Table 1 were performed quite similarly to Production example 1, the reaction solvent was removed completely by an extruder with vent attached having a vent port installed for distilling off carbon tetrachloride under reduced pressure, and the chlorinated polypropylene composition was extruded strand-like and cooled with water to obtain 15 types of solids of chlorinated polypropylene pelletized with water-cooled pelletizer (from Katsu Seisakusho Inc., Model KM-150).

PRODUCTION EXAMPLE 3

In a three-neck flask equipped with stirrer, dropping funnel and cooling tube for refluxing monomer were placed 6 kg of ethylene-propylene copolymer with melt viscosity of about 2500 mPa.s at 180° C. and ethylene content of 3 mol %, and the copolymer was molten completely in an oil bath with temperature kept constantly at 180° C. After the inside of flask was substituted with nitrogen for about 10 minutes, 240 g of maleic anhydride were charged over about 5 minutes while stirring, and then a solution of 24 g of di-tert-butyl peroxide in 100 ml of heptane was charged through dropping funnel over about 30 minutes. At this time, the inside of system was kept at 180° C. After continuing the reaction further for 1 hour, unreacted maleic anhydride was removed over about 30 minutes, while reducing the pressure in flask with aspirator. Next, this product was subjected to chlorinating reaction according to the method of Production example 1, and various epoxy compounds and hydrotalcite compound shown in Table 2 were added, respectively, as the stabilizers to obtain 9 types of maleic anhydride-modified chlorinated ethylene-propylene copolymer with chlorine content of 22% by weight and solids concentration of 20% by weight (in toluene solution).

TABLE 2

Substance of various stabilizers

| No. | Stabilizer | Epoxide equivalent | Addition* level |
|---|---|---|---|
| 16 | Bisphenol A glycidyl ether | 190 | 5% |
| 17 | Epoxidated soybean oil | 250 | 5% |
| 18 | sec-Butylphenyl glycidyl ether | 226 | 5% |
| 19 | Hydrotalcite compound | — | 2% |
| 20 | Bisphenol A glycidyl ether | 190 | 3% |
| | Hydrotalcite compound | — | 0.5% |
| 21 | Epoxidated soybean oil | 250 | 3% |
| | Hydrotalcite compound | — | 0.5% |
| 22 | sec-Butylphenyl glycidyl ether | 226 | 3% |
| | Hydrotalcite compound | — | 0.5% |
| 23 | sec-Butylphenyl glycidyl ether | 226 | 10% |
| | Hydrotalcite compound | — | 0.1% |
| 24 | sec-Butylphenyl glycidyl ether | 226 | 1% |
| | Hydrotalcite compound | — | 10% |

*Addition level: % by weight based on solids of chlorinated polyolefin
Hydrotalcite compound: $Mg_{4.5}Al_2(OH)_{13}CO_3.3.5H_2O$ was used.

PRODUCTION EXAMPLE 4

After chlorination and addition of stabilizers in Table 2 were performed quite similarly to Production example 3, the reaction solvent was removed completely by an extruder with vent attached, having a vent port installed for distilling off carbon tetrachloride under reduced pressure, and the maleic anhydride-modified chlorinated ethylene-propylene copolymer was extruded strand-like and cooled with water to obtain 9 types of solids of maleic anhydride-modified chlorinated ethylene-propylene copolymer pelletized with water-cooled pelletizer (from Katsu Seisakusho Inc., Model KM-150).

PRODUCTION EXAMPLE 5

Using terpolymer with melt index of 200 g/10 min (measured according to JIS K6730), containing 91% by weight of ethylene, 5.7% by weight of ethyl acrylate and 3.3% by weight of maleic anhydride as a raw material resin, production was performed by the quite similar method to Production examples 1 and 2, except that the stabilizers No. 6 and No. 13 in Table 1 were used, to obtain a solution article (20% toluene solution) and solid article (pellets) of chlorinated terpolymer with chlorine content of 20% by weight.

PRODUCTION EXAMPLE 6

Using ethylene-vinyl acetate copolymer with melt index of 15 g/min (measured according to ASTM D1238-62T) and vinyl acetate content of 14 mol % as a raw material resin, production was performed by the quite similar method to Production examples 1 and 2, except that the stabilizers No. 1 and No. 8 in Table 1 were used, to obtain a solution article (20% toluene solution) and solid article (pellets) of chlorinated ethylene-vinyl acetate copolymer with chlorine content of 12% by weight.

In Table 3 through Table 6, the substance of chlorinated polyolefin compositions obtained in Production examples 1 through 6 are summerized.

TABLE 3

| Substance of chlorinated polyolefin compositions produced in Production example 1 | | | | | | | |
|---|---|---|---|---|---|---|---|
| | Stabilizer | | Form of chlorinated polyolefin | | | Raw | Chlorine |
| Production No. | Type | Addition level | Solution article | Solid article | Production example | material polyolefin | content (% by weight) |
| 1 | Bisphenol A glycidyl ether | 4% | 20% | — | 1 | Crystal- | 30 |
| 2 | Epoxidated soybean oil | 4% | Toluene | — | | line | |
| 3 | Polyglycerol polyglycidyl ether | 4% | Solution | — | | poly- | |
| 4 | 2-Ethylhexyl glycidyl ether | 4% | | — | | propylene | |
| 5 | Phenyl glycidyl ether | 4% | | — | | | |
| 6 | sec-Butylphenyl glycidyl ether | 4% | | — | | | |
| 7 | Hydrotalcite compound | 4% | | — | | | |
| 8 | Bisphenol A glycidyl ether | 2% | | — | | | |
| | Hydrotalcite compound | 1% | | — | | | |
| 9 | Epoxidated soybean oil | 2% | | — | | | |
| | Hydrotalcite compound | 1% | | — | | | |
| 10 | Polyglycerol polyglycidyl ether | 2% | | — | | | |
| | Hydrotalcite compound | 1% | | — | | | |
| 11 | 2-Ethylhexyl glycidyl ether | 2% | | — | | | |
| | Hydrotalcite compound | 1% | | — | | | |
| 12 | Phenyl glycidyl ether | 2% | | — | | | |
| | Hydrotalcite compound | 1% | | — | | | |
| 13 | sec-Butylphenyl glycidyl ether | 2% | | — | | | |
| | Hydrotalcite compound | 1% | | — | | | |
| 14 | sec-Butylphenyl glycidyl ether | 10% | | — | | | |
| | Hydrotalcite compound | 1% | | — | | | |
| 15 | sec-Butylphenyl glycidyl ether | 1% | | — | | | |
| | Hydrotalcite compound | 1% | | — | | | |

TABLE 4

| Substance of chlorinated polyolefin compositions produced in Production example 2 | | | | | | | |
|---|---|---|---|---|---|---|---|
| | Stabilizer | | Form of chlorinated polyolefin | | | Raw | Chlorine |
| Production No. | Type | Addition level | Solution article | Solid article | Production example | material polyolefin | content (% by weight) |
| 16 | Bisphenol A glycidyl ether | 4% | — | Pellet | 2 | Crystal- | 30 |
| 17 | Epoxidated soybean oil | 4% | — | | | line | |
| 18 | Polyglycerol polyglycidyl ether | 4% | — | | | poly- | |
| 19 | 2-Ethylhexyl glycidyl ether | 4% | — | | | propylene | |
| 20 | Phenyl glycidyl ether | 4% | — | | | | |
| 21 | sec-Butylphenyl glycidyl ether | 4% | — | | | | |
| 22 | Hydrotalcite compound | 4% | — | | | | |
| 23 | Bisphenol A glycidyl ether | 2% | — | | | | |
| | Hydrotalcite compound | 1% | — | | | | |
| 24 | Epoxidated soybean oil | 2% | — | | | | |
| | Hydrotalcite compound | 1% | — | | | | |
| 25 | Polyglycerol polyglycidyl ether | 2% | — | | | | |
| | Hydrotalcite compound | 1% | — | | | | |
| 26 | 2-Ethylhexyl glycidyl ether | 2% | — | | | | |
| | Hydrotalcite compound | 1% | — | | | | |
| 27 | Phenyl glycidyl ether | 2% | — | | | | |
| | Hydrotalcite compound | 1% | — | | | | |
| 28 | sec-Butylphenyl glycidyl ether | 2% | — | | | | |
| | Hydrotalcite compound | 1% | — | | | | |
| 29 | sec-Butylphenyl glycidyl ether | 10% | — | | | | |
| | Hydrotalcite compound | 0.1% | — | | | | |
| 30 | sec-Butylphenyl glycidyl ether | 1% | — | | | | |
| | Hydrotalcite compound | 10% | — | | | | |

TABLE 5

Substance of chlorinated polyolefin compounds produced in Production example 3

| Production No. | Stabilizer Type | Addition level | Form of chlorinated polyolefin: Solution article | Form of chlorinated polyolefin: Solid article | Production example | Raw material polyolefin | Chlorine content (% by weight) |
|---|---|---|---|---|---|---|---|
| 31 | Bisphenol A glycidyl ether | 5% | 20% | — | 3 | Maleic | 22 |
| 32 | Epoxidated soybean oil | 5% | Toluene | — | | anhydride- | |
| 33 | sec-Butylphenyl glycidyl ether | 5% | solution | — | | modified | |
| 34 | Hydrotalcite compound | 5% | | — | | ethylene | |
| 35 | Bisphenol A glycidyl ether | 3% | | — | | propylene | |
| | Hydrotalcite compound | 0.5% | | | — | copolymer | |
| 36 | Epoxidated soybean oil | 3% | | — | | | |
| | Hydrotalcite compound | 0.5% | | — | | | |
| 37 | sec-Butylphenyl glycidyl ether | 3% | | — | | | |
| | Hydrotalcite compound | 0.5% | | — | | | |
| 38 | sec-Butylphenyl glycidyl ether | 10% | | — | | | |
| | Hydrotalcite compound | 0.1% | | — | | | |
| 39 | sec-Butylphenyl glycidyl ether | 1% | | — | | | |
| | Hydrotalcite compound | 10% | | — | | | |

TABLE 6

Substance of chlorinated polyolefin compounds produced in Production example 4 through 6

| Production No. | Stabilizer Type | Addition level | Form of chlorinated polyolefin: Solution article | Form of chlorinated polyolefin: Solid article | Production example | Raw material polyolefin | Chlorine content (% by weight) |
|---|---|---|---|---|---|---|---|
| 40 | Bisphenol A glycidyl ether | 5% | — | Pellet | 4 | Maleic | 22 |
| 41 | Epoxidated soybean oil | 5% | — | | | anhydride- | |
| 42 | sec-Butylphenyl glycidyl ether | 5% | — | | | modified | |
| 43 | Hydrotalcite compound | 5% | — | | | ethylene- | |
| 44 | Bisphenol A glycidyl ether | 3% | — | | | propylene | |
| | Hydrotalcite compound | 0.5% | — | | | copolymer | |
| 45 | Epoxidated soybean oil | 3% | — | | | | |
| | Hydrotalcite compound | 0.5% | — | | | | |
| 46 | sec-Butylphenyl glycidyl ether | 3% | — | | | | |
| | Hydrotalcite compound | 0.5% | — | | | | |
| 47 | sec-Butylphenyl glycidyl ether | 10% | — | | | | |
| | Hydrotalcite compound | 0.1% | — | | | | |
| 48 | sec-Butylphenyl glycidyl ether | 1% | — | | | | |
| | Hydrotalcite compound | 10% | — | | | | |
| 49 | sec-Butylphenyl glycidyl ether | 4% | 20% | — | 5 | Terpolymer | 20 |
| 50 | sec-Butylphenyl glycidyl ether | 2% | Toluene | — | | | |
| | Hydrotalcite compound | 1% | solution | | | | |
| 51 | sec-Butylphenyl glycidyl ether | 4% | — | Pellet | | | |
| 52 | sec-Butylphenyl glycidyl ether | 2% | — | | | | |
| | Hydrotalcite compound | 1% | — | | | | |
| 53 | Bisphenol A glycidyl ether | 4% | 20% | — | 6 | Ethylene- | 12 |
| 54 | Bisphenol A glycidyl ether | 2% | Toluene | — | | vinyl | |
| | Hydrotalcite compound | 1% | solution | — | | acetate | |
| 55 | Bisphenol A glycidyl ether | 4% | — | Pellet | | copolymer | |
| 56 | Bisphenol A glycidyl ether | 2% | — | | | | |
| | Hydrotalcite compound | 1% | — | | | | |

EXAMPLE 1

The chlorinated polyolefin solution compositions of Production Nos. 8 through 15 and Nos. 35 through 39 in Table 3 and Table 5 were coated respectively onto untreated polypropylene film (hereinafter, referred to as untreated PP) with coating rod #14, and, after dried for 24 hours at room temperature, the heat seal strength test was performed. For the heat seal strength test, coated surfaces were superposed and heat sealed for 2 seconds under the pressing conditions of 120° C.–1 kg/cm$^2$. Then, after 24 hours, 180° peeling strength was measured with Tensilon (pulling speed: 50 mm/min). Moreover, with respect to the chlorinated polyolefin solution compositions of Nos. 50 and 54 in Table 6, they were coated onto each film of linear low-density polyethylene (hereinafter, referred to as LLDPE), low-density polyethylene (hereinafter, referred to as LDPE) and high-density polyethylene (hereinafter, referred to as HDPE) to perform the heat seal strength test. Except that the heat seal temperature was 90° C., test was performed quite similarly to the method aforementioned.

Next, the chlorinated polyolefin solution compositions of Production Nos. 8 through 15, 35 through 39, 50 and 54 were placed in a glass vessel that could be made airtight completely, and preserved for 3 months at 50° C., followed by heat seal strength test quite similar to above. Results are shown in Table 7.

COMPARATIVE EXAMPLE 1

Except that the chlorinated polyolefin solution compositions of Production Nos. 1 through 7 and Nos. 31 through 34 in Table 3 and Table 5 were tested for heat seal with untreated PP, and the chlorinated polyolefin solution compositions of Nos. 49 and 53 in Table 6 with each polyethylene film, test was made quite similarly to Example 1. Results are shown in Table 7.

TABLE 7

Heat seal strength (g/cm) [Example 1 and Comparative example 1]

| | Solution | Example 1 Type of film | | | | Solution | Comparative example 1 Type of film | | | |
|---|---|---|---|---|---|---|---|---|---|---|
| | comp. No. | Untreated PP | LLDPE | LDPE | HDPE | Comp. No. | Untreated PP | LLDPE | LDPE | HDPE |
| 50° C. | 8 | 220 | — | — | — | 1 | 230 | — | — | — |
| \| | 9 | 215 | — | — | — | 2 | 220 | — | — | — |
| 3 months | 10 | 230 | — | — | — | 3 | 215 | — | — | — |
| \| | 11 | 225 | — | — | — | 4 | 220 | — | — | — |
| before | 12 | 210 | — | — | — | 5 | 235 | — | — | — |
| preserv- | 13 | 225 | — | — | — | 6 | 220 | — | — | — |
| ation | 14 | 220 | — | — | — | 7 | 230 | — | — | — |
| | 15 | 235 | — | — | — | 31 | 350 | — | — | — |
| | 35 | 355 | — | — | — | 32 | 345 | — | — | — |
| | 36 | 335 | — | — | — | 33 | 340 | — | — | — |
| | 37 | 340 | — | — | — | 34 | 335 | — | — | — |
| | 38 | 325 | — | — | — | 49 | — | 230 | 110 | 210 |
| | 39 | 330 | — | — | — | 53 | — | 220 | 95 | 200 |
| | 50 | | 210 | 100 | 205 | | | | | |
| | 54 | | 220 | 105 | 210 | | | | | |
| 50° C. | 8 | 230 | — | — | — | 1 | 105 | — | — | — |
| \| | 9 | 210 | — | — | — | 2 | 100 | — | — | — |
| 3 months | 10 | 220 | — | — | — | 3 | 95 | — | — | — |
| \| | 11 | 220 | — | — | — | 4 | 90 | — | — | — |
| after | 12 | 215 | — | — | — | 5 | 105 | — | — | — |
| preserv- | 13 | 230 | — | — | — | 6 | 105 | — | — | — |
| ation | 14 | 225 | — | — | — | 7 | 70 | — | — | — |
| | 15 | 210 | — | — | — | 31 | 130 | — | — | — |
| | 35 | 350 | — | — | — | 32 | 120 | — | — | — |
| | 36 | 340 | — | — | — | 33 | 110 | — | — | — |
| | 37 | 350 | — | — | — | 34 | 105 | — | — | — |
| | 38 | 355 | — | — | — | 49 | — | 110 | 50 | 100 |
| | 39 | 345 | — | — | — | 53 | — | 105 | 20 | 90 |
| | 50 | | 220 | 110 | 200 | | | | | |
| | 54 | | 215 | 100 | 220 | | | | | |

EXAMPLE 2

In a glass vessel with inner volume of about 50 ml were placed 10 g of solids (pellet) of the chlorinated polyolefin compositions of Production Nos. 23 through 30, Nos. 44 through 48 and Nos. 52 and 56 in Table 4 and Table 6, and pH test paper (from Toyo Filter Paper Co., Ltd.) was hung in the space of glass vessel, which was made airtight completely. Next, this was placed in a blast dryer of 50° C. to observe the change of pH with time, the results of which are shown in Table 8.

COMPARATIVE EXAMPLE 2

With solids (pellet) of the chlorinated polyolefin compositions of Production Nos. 16 through 22, Nos. 40 through 43 and Nos. 51 and 55 in Table 4 and Table 6, change of pH was observed with time by the similar method to Example 2. Results are shown in Table 8.

TABLE 8

Change of pH overtime [Example 2 and Comparative example 2

| Solid | Example 2 Number of days elapsed | | | | Solid | Comparative example 2 Number of days elapsed | | | |
|---|---|---|---|---|---|---|---|---|---|
| comp. No. | After 7 days | After 14 days | After 21 days | After 28 days | comp. No. | After 7 days | After 14 days | After 21 days | After 28 days |
| 23 | 7 | 7 | 6 | 6 | 16 | 6 | 5 | 4 | 2 |
| 24 | 7 | 7 | 6 | 6 | 17 | 6 | 5 | 4 | 2 |
| 25 | 7 | 7 | 6 | 6 | 18 | 6 | 5 | 4 | 2 |

TABLE 8-continued

Change of pH overtime [Example 2 and Comparative example 2

| Solid comp. No. | Example 2 Number of days elapsed | | | | Solid comp. No. | Comparative example 2 Number of days elapsed | | | |
|---|---|---|---|---|---|---|---|---|---|
| | After 7 days | After 14 days | After 21 days | After 28 days | | After 7 days | After 14 days | After 21 days | After 28 days |
| 26 | 7 | 7 | 6 | 6 | 19 | 6 | 5 | 4 | 2 |
| 27 | 7 | 7 | 6 | 6 | 20 | 6 | 5 | 4 | 2 |
| 28 | 7 | 7 | 6 | 6 | 21 | 6 | 5 | 4 | 2 |
| 29 | 7 | 7 | 6 | 6 | 22 | 6 | 5 | 4 | 2 |
| 30 | 7 | 7 | 6 | 6 | 40 | 5 | 4 | 2 | 1 |
| 44 | 7 | 6~7 | 5 | 4 | 41 | 5 | 4 | 2 | 1 |
| 45 | 7 | 6~7 | 5 | 4 | 42 | 5 | 4 | 2 | 1 |
| 46 | 7 | 6~7 | 5 | 4 | 43 | 5 | 4 | 2 | 1 |
| 47 | 7 | 6~7 | 5 | 4 | 51 | 5 | 4 | 2 | 1 |
| 48 | 7 | 6~7 | 5 | 4 | 55 | 6 | 5 | 4 | 2 |
| 52 | 7 | 6~7 | 5 | 4 | | | | | |
| 56 | 7 | 7 | 6 | 6 | | | | | |

EXAMPLE 3

With the chlorinated polyolefin solution compositions of Production Nos. 35 through 39 in Table 5, primers were prepared and painted plates were fabricated to conduct the ultraviolet resistance test with QUV accelerated weathering tester (from Q-panel Company). For deciding the results, the deterioration of painted film was judged, measuring the adherence for every QUV exposure time. Results are shown in Table 9.

COMPARATIVE EXAMPLE 3

With the chlorinated polyolefin solution compositions of Production Nos. 31 through 34 in Table 5, similar test to Example 3 was performed to examine the ultraviolet resistance. Results are shown in Table 9.

TABLE 9

Test of ultraviolet resistance (adherence: cross-cut cellophane adhesive type) Example 3 and Comparative example 3

| | Solution comp. No. | QUV exposure time 0 hour | 200 hours | 500 hours | 1000 hours |
|---|---|---|---|---|---|
| Example 3 | 35 | 100/100 | 100/100 | 100/100 | 100/100 |
| | 36 | 100/100 | 100/100 | 100/100 | 100/100 |
| | 37 | 100/100 | 100/100 | 100/100 | 100/100 |
| | 38 | 100/100 | 100/100 | 100/100 | 100/100 |
| | 39 | 100/100 | 100/100 | 100/100 | 100/100 |
| Comparative example 3 | 31 | 100/100 | 95/100 | 75/100 | 10/100 |
| | 32 | 100/100 | 75/100 | 60/100 | 15/100 |
| | 33 | 100/100 | 90/100 | 45/100 | 5/100 |
| | 34 | 100/100 | 80/100 | 55/100 | 25/100 |

[Testing method]

1) Basic composition of primer

Chlorinated polyolefin solution composition (20% toluene solution) - - - 100 parts by weight Titanium dioxide - - - 10 parts by weight Carbon black - - - 0.2 parts by weight 2) Preparation of primer After said composition was kneaded for about 1 hour in sand mill, it was diluted with xylene so as to become 12 to 13 sec/20° C. with Ford cup #4 for adjustment.

3) Painting method

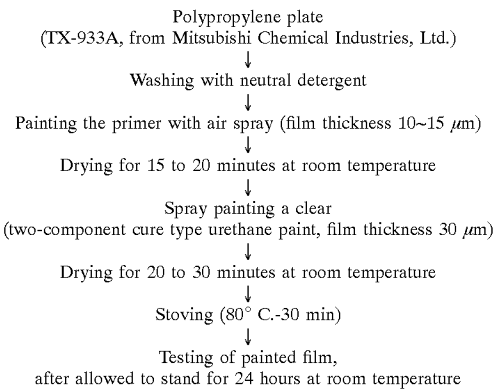

4) Adherence

Making 100 cross-cuts reaching base at intervals of 1 mm on the painted surface, cellophane adhesive tape was adhered closely thereon and peeled off in the direction of 180° to examine the remaining number of cross-cuts.

(From the results of Table 7)

The polyolefin solution compositions in Example 1 use hydrotalcite compound and epoxy compound in combination, but, in Comparative example 1, hydrotalcite compound or epoxy compound is used each independently. In the case of Example 1, the heat seal strength does not decrease even after the solution composition was preserved for 3 months at 50° C., whereas, in Comparative example 1, the heat seal strength decreases.

(From the results of Table 8)

The polyolefin solid compositions in Example 2 use hydrotalcite compound and epoxy compound in combination, but, in Comparative example 2, hydrotalcite compound or epoxy compound is used each independently. When preserving the solid composition in Comparative example 2 for 28 days in an atmosphere of 50° C., pH in the space of preserving vessel shows conspicuous change, whereas, in the case Example 2, no significant change can be seen.

(From the results of Table 9)

The polyolefin solution compositions in Example 3 use hydrotalcite compound and epoxy compound in combination, but, in Comparative example 3, hydrotalcite compound or epoxy compound is used each independently. Since this painting system is painted with clear painted film for upper coating, the ultraviolet rays transmit the clear painted film and reach the primer (polyolefin composition) on irradiating QUV. In the case of Example 3, no change is seen in the adherence after QUV exposure, whereas, in Comparative example, 3 peeling was seen between clear painted film and primer.

As describe above, the results of Tables 7 through 9 show that, by using hydrotalcite compound and epoxy compound in combination rather than using them independently as the stabilizers, excellent heat stability and ultraviolet resistance can be obtained, thus indicating the usefulness of the invention.

What is claimed is:

1. A non-crosslinkable chlorinated polyolefin composition comprising:

(a) 100 parts by weight of chlorinated polyolefin with chlorine content of 5 to 50% by weight, (b) 0.1 to 10 parts by weight of hydrotalcites compound, and (c) 1 to 10 parts by weight of epoxy compound with epoxide equivalent of 100 to 500, and (d) hydrotalcites compound/epoxy compound being 0.01 to 10 (weight ratio).

2. A paint applicable to films, sheets and moldings of polyolefin, having the chlorinated polyolefin composition of claim 1 as an effective component.

3. An ink applicable to films, sheets and moldings of polyolefin, having the chlorinated polyolefin composition of claim 1 as an effective component.

4. An adhesive applicable to films, sheets and moldings of polyolefin, having the chlorinated polyolefin composition of claim 1 as an effective component.

5. A primer applicable to films, sheets and moldings of polyolefin, having the chlorinated polyolefin composition of claim 1 as an effective component.

* * * * *